3,010,933
POLYESTER RESIN COMPOSITIONS
Francis Lyon, Laurelton, N.Y., assignor to Columbian Carbon Company, New York, N.Y., a corporation of Delaware
No Drawing. Filed Nov. 28, 1958, Ser. No. 776,745
13 Claims. (Cl. 260—40)

The present invention relates to resins of the type known to the trade as polymerizable, unsaturated polyester resins, and provides an improved method of curing such resins in admixture with carbon black as a filler. The invention also provides improved resin compositions comprising these unsaturated polyester resins and carbon black.

More particularly, the resins to which the present invention relates are generally classified as thermosetting resins, even though they are susceptible to cure without heating at room temperature. They are of the well-known type resulting from dissolving an unsaturated polyester of a polyhydric alcohol and a dibasic acid in a vinyl monomer. The unsaturation is introduced into the polyester through the use of an unsaturated dibasic acid, for instance maleic acid, fumaric acid, phthalic acid, adipic acid or their anhydrides or mixtures thereof. As the polyhydric alcohol, there may be used, for instance, ethylene glycol, diethylene glycol, propylene glycol or the like, or mixtures thereof. These polyesters are known to be of linear structure with reoccurring double bonds.

A particularly advantageous resin of this type for use in accordance with the present invention, is one prepared by dissolving the polyester, for instance a polyester of maleic anhydride and ethylene glycol, in styrene. However, in place of styrene, other vinyl monomers may be used, for example vinyl acetate or diallyl phthalate.

The physical properties of these polymerizable resin solutions, for instance viscosity and degree of unsaturation, are known to vary over a considerable range depending in part, at least, upon the identity and proportions of the reactant acid and alcohol and vinyl monomer used. The present invention is applicable generally to all such unsaturated polyester resins, i.e. polymerizable solutions of esters of these polyhydric alcohols and dicarboxylic acids in a vinyl monomer, though greater advantage may be obtained with some than with others.

These so-called unsaturated polyester resins are particularly suitable for casting. Their cure is ordinarily effected by the use of one of a large number of well-known peroxide catalysts, either with or without the application of heat.

Polyester resins of this type have been extensively used in the industry in producing resin laminates and castings for structural parts of aircrafts, boats, trucks, and other machines. Other applications include automobile bodies, pipe, bathtubs, luggage, furniture and cabinets for various appliances. However, a deterrent to their still further use has been their relatively high cost and the danger of the developing of cracks during the curing of the resin.

The mixing of fillers, or extenders, with these resins has been proposed to reduce material costs, and to reduce the danger of cracking, and various relatively inexpensive fillers have been added in varying substantial amounts, depending upon the intended use of the product.

The addition of such fillers tends to raise the heat capacity of the resin casting material, thus reducing the peak temperature, i.e. peak exotherm, developed during curing and reducing the rate at which strains are developed within the casting. The danger of cracking can thus be reduced since cracking is dependent primarily upon the rate at which strains are developed and relieved. This is of particular importance in making large castings.

Various inorganic fillers have been proposed for this purpose, including kaolin, bentonite, whiting, calcium carbonate, pyrites, and aluminum oxide, the specific gravities of which range from 2.5 to 5.6.

The use of fillers of lower specific gravities than those just named has been recognized as highly desirable. It has further been recognized that carbon black, with a specific gravity of 1.8, would be a most desirable filler for such resins from the standpoint of its gravity. However, carbon black has heretofore been found unsuitable for this purpose for the reason that it retards the curing of the resin by conventional curing methods.

It is an object of my present invention to provide a method whereby carbon black can be successfully and economically incorporated in such resins as a filler. It is a further object to avoid the retarding effect of carbon black on the curing of such resins when present therein. A still further object is to minimize the tendency of the castings to crack during curing. These and other advantages, as will hereinafter appear, are attained in accordance with my present invention.

I have found, quite unexpectedly, that by using certain peroxide catalyst in conjunction with certain other chemical compounds the curing of these polyester resins is actually accelerated by the presence of the carbon black and that a satisfactorily rapid cure may be obtained. These novel results are obtained, in accordance with my present invention, by using a diaroyl peroxide, as the catalyst, in conjunction with a compound of the type hereinafter described. For this purpose, I have used benzoyl peroxide, p-chlorobenzoyl peroxide and 2-4,di-chlorobenzoyl peroxide with particular advantage.

The curing of these polyester resins by catalyst of this type is normally retarded by the presence of carbon black. I have found, however, that where a small amount of (1) a primary aromatic amine, or (2) of an aryl-alkyl secondary amine, or (3) of an aryl-alkyl tertiary amine, or (4) resorcinol is used in conjunction with the catalyst, the curing of the resin is materially accelerated by the presence of the carbon black.

Amines of the types just noted which have been used with particular advantage are (1) aniline and ortho, meta and para-toluidine, (2) N-methyl aniline, and (3) dimethyl aniline, diethyl aniline, dipropyl aniline, dimethyl-o-toluidine, dimethyl-m-toluidine, dimethyl-p-toluidine, p-dimethyl-aminobenzaldehyde, p-dimethyl-amino benzoic acid, p-chlorodimethylaniline and m-diethylamino phenol, the latter preferably at low temperature. For convenient reference, these compounds are hereinafter sometimes referred to as a promoter.

For the purpose of my invention, I may use any type of carbon black, for instance, either furnace black, impingement black, or lamp black. The black may have either alkaline, neutral, or acidic characteristics. The particle size of the black does not appear to be critical.

Unsaturated polyester resins which I have used with particular advantage in accordance with my present invention include those marketed under the trade name Laminac 4123; Laminac 4128; Laminac 4129 and Laminac 4134 by American Cyanamid Company and those marketed under the trade name BRSQ 147 and BRSQ 193 by Bakelite Corporation. Each of these products just noted consists essentially of unsaturated polyesters, of the type previously herein described, dissolved in styrene and is a thermosetting resin solution. The Laminac 4134 and the BRSQ 147 have a relatively low degree of unsaturation. The Laminac 4123 and BRSQ 193 have a medium degree of unsaturation. The Laminac 4129 and Laminac 4128 are highly unsaturated.

The composition designated by the trade name BRS–193, for instance, has the following physical properties:

| | |
|---|---|
| Specific gravity | 1.140–1.148 |
| Viscosity, cps | 1900–2500 |
| Acid number | 30–33 |
| Refractive index | 1.5326 |
| Styrene content, percent | 29.5 |
| Solids, percent reactive | 100 |

As previously noted, these resins just designated by their trade names are essentially solutions in styrene of unsaturated polyesters, of linear structure and having reoccurring double bonds, resulting from the reacting of a dibasic acid, such as maleic acid or the anhydride thereof, with a polyhydric alcohol, such as diethylene glycol.

The proportions of the several constituents used may be varied over a considerable range, as will hereinafter be illustrated.

The effect of carbon black in inhibiting the curing of these resins, when the promoter is omitted, is illustrated by the following tests: 10 parts of EPC carbon black was mixed with 100 parts of the BRSQ 147 resin previously described. To this mixture there was added one part of a peroxide catalyst marketed under the trade name Luperco ATC, consisting essentially of 50% benzoyl peroxide in tricresyl phosphate. After thorough mixing, the resultant mixture was placed in a constant temperature bath at 80° C. and at the end of four hours no curing of the resin mixture had occurred. This same mixture with the carbon black omitted, was readily cured under similar conditions in 15 minutes. Similar results were obtained in attempts to cure each of the resins previously specifically identified herein, both with and without the inclusion of the carbon black.

The effectiveness of my present invention in the curing of these unsaturated polyester resins containing carbon black is illustrated by the following specific examples.

*Example I*

A series of tests were run in which the proportion of the promoter used was varied over a considerable range to illustrate the effect of varying proportions of the promoter on the time required to cure the resin. In each of these tests, 100 parts of Laminac 4123, 10 parts of SRF carbon black and 2 parts of the Luperco ATC catalyst were thoroughly mixed together and there was incorporated in the mixture different proportions of N-di-ethyl aniline as the promoter. The respective batches were then cured at a temperature of 80° C. and the curing time recorded. The concentration of the promoter in the several batches and the curing time, expressed in minutes, are set forth in the following tabulation, the concentration of the promoter being expressed in percent based on the weight of the resin.

| Promoter (percent): | Curing time (mins.) |
|---|---|
| 0.3 | 2 |
| 0.2 | 2 |
| 0.1 | 2.5 |
| 0.07 | 3.5 |
| 0.03 | 6 |
| 0.025 | 10 |
| 0.01 | 22 |

*Example II*

Further tests were run using mixtures composed of 100 parts of the BRSQ 193 resin, 15 parts of HMF carbon black (Statex 93), 4 parts of the Luperco ATC catalyst and varying proportions of p-di-methylaminobenzaldehyde as the promoter. These mixtures were cured at a temperature of 80° C. The proportion of promoter used and the curing time, expressed as in the preceding Example, are set forth in the following tabulation:

| Promoter (percent): | Curing time (mins.) |
|---|---|
| 0.05 | 12 |
| 0.1 | 6 |
| 0.15 | 4 |
| 0.2 | 2.5 |

From the foregoing tests it appears that the curing rate is increased by an increase in the proportion of promoter used. It also appears that proportions of promoter as low as 0.05% counteracts the normally encountered cure-inhibiting effect of the carbon black.

In the foregoing tests, the maximum temperatures obtained during curing were within the range of 255 to 310° F. and no cracking of the resin was observed. Though the proportion of promoter used may be varied over a considerable range, I have found that the peak exotherm is generally lowered as the concentration of the promoter is decreased.

The concentration of the catalyst employed is likewise subject to considerable variation. Generally, I have found that the peak exotherm is somewhat increased by an increased proportion of the catalyst. However, an increase in catalyst proportion has a tendency to increase the cure rate. This is illustrated by the following example:

*Example III*

In this test, varying proportions of the catalyst were incorporated in a mixture of 100 parts BRSQ 193 resin, 15 parts HMF carbon black (Statex 93), and 0.2 part p-di-methylaminobenzaldehyde, and the mixtures were cured at a temperature of 80° C. The proportion of catalyst used, the curing time and the peak exotherm attained in these tests, are as set forth in the following tabulation:

| Catalyst (parts by weight) | Curing Time (mins.) | Peak Exotherm, ° F. |
|---|---|---|
| 2 | 3 | 260 |
| 3 | 3 | 290 |
| 4 | 2.5 | 310 |
| 5 | 2.5 | 325 |

The proportion of carbon black used in the formula is likewise subject to considerable variation. Carbon black loadings of from 0.1 to 100 parts by weight per 100 parts of the resin have been used successfully. I have found that, in general, the peak exotherm is decreased as the proportion of carbon is increased. I have also found that the curing rate, under given conditions, is generally increased as the proportion of carbon is increased, further indicating that the carbon serves as an accelerator of the curing reaction.

These facts are illustrated by the following example:

*Example IV*

Five batches of the resin mixture were prepared, each containing 100 parts Laminac 4128 resin, 2 parts Luperco ATC and 0.3 part of p-di-methylaminobenzaldehyde and 0.033 part N-di-ethyl aniline as the promoter. Various proportions of SRF carbon black (Furnex) were incorporated in the respective mixtures by milling and thereafter the mixtures were cured at a temperature of 78° to 82° F. The proportion of carbon black, in parts by weight, the curing time and the peak exotherm are set forth in the following tabulation. For comparison a sample of the mixture just described, to which no carbon black was added, is included.

| Parts Carbon Black | Curing Time (mins.) | Peak Exotherm, ° F. |
|---|---|---|
| None | No cure in 100 | 270 |
| 3.1 | 52 | 215 |
| 12.5 | 42 | 195 |
| 50.0 | 30 | 108 |
| 70.0 | 21 | |

The effectiveness of carbon black as an accelerator of cure is further illustrated by the following example:

Example V

In these tests, equal proportions of carbon black and other fillers were incorporated in otherwise identical resin mixtures composed of 100 parts Laminac 4123 resin, 2 parts Luperco ATC catalyst, 0.2 part N-diethyl aniline, the proportion of filler in each instance being 10 parts. The resultant mixtures were cured at a temperature of 79° to 82° F. The identity of the filler, the cure time and the peak exotherm attained in the cure thereof are set forth in the following tabulation:

| Filler | Curing Time (min.) | Peak Exotherm, °F. |
|---|---|---|
| EPC Carbon (Micronex W-6) | 3.5 | 180 |
| SRF Carbon (Furnex) | 4.0 | 210 |
| EPC Carbon (Micronex W-6 deoxidized) | 5.0 | 145 |
| Zinc Oxide | 13.0 | 235 |
| None | 25.0 | 245 |
| Silica | 37.0 | 230 |

The aggregate surface area of the respective fillers used in this test, as determined by the nitrogen adsorption method, were as follows:

Filler: Surface area (acres per lb.)
    EPC (Micronex W-6) _____ 11.5
    SRF (Furnex) _____ 2.6
    Silica _____ 12.4
    Zinc oxide _____ 0.7

It appears, therefore, that the nature, rather than the extent of surface area of the filler, is a factor in the curing rate, as the silica which had the largest surface area resulted in the maximum curing time while the EPC carbon having the next largest surface area resulted in the minimum curing time.

Where no carbon black is incorporated, the hardness of the resultant resin does not appear to be influenced by the proportion of catalyst used over a range of from 2% to 10%. However, I have found that where carbon black is incorporated in the resin, the hardness of the cured resin can be increased, or decreased by varying the proportion of carbon employed or by varying the concentration of the catalyst. The influence of varying the proportions of carbon upon the hardness of the resin is illustrated by the following example:

Example VI

Varying proportions of SRF carbon black were incorporated by milling in otherwise identical resin mixtures composed of 100 parts Laminac 4128 resin, 2 parts of Luperco ATC catalyst, and 0.3 part of p-dimethylaminobenzaldehyde and 0.033 part of N-diethyl aniline as the promoter. These separate batches were cured at a temperature of 80° F., post-cured at a temperature of 245° F. and their hardness then determined by means of a Barco Impressor. The proportions of carbon black incorporated and the hardness of the respective samples are set forth in the following tabulation:

| CARBON BLACK (parts by weight) | HARDNESS (Barco units) |
|---|---|
| 5 | 63 |
| 10 | 64 |
| 15 | 65 |
| 20 | 66 |
| 25 | 68 |
| 30 | 60 |
| 50 | 55 |

The effect of varying the proportion of catalyst and the proportion and type of carbon black are illustrated by the following example:

Example VIII

Varying proportions of the Luperco ATC catalyst and of different types of carbon black were incorporated into separate samples of otherwise identical resin mixtures composed of 100 parts Laminac 4128 resin, 0.3 part p-dimethylaminobenzaldehyde and 0.33 part N-diethyl aniline as promoter. The carbon black was worked into the respective mixtures by milling. Thereafter the respective mixtures were cured at 80° F., post-cured at 245° F. and the hardness of the respective samples determined as in the preceding example. The identity and proportions of carbon black and the proportions of catalyst and the hardness of the respective samples are set forth in the following tabulation:

| Filler (parts by weight) | Catalyst, percent | Hardness (Barco Units) |
|---|---|---|
| 20 (FF-Statex B) | 2 | 15 |
| 20 (FF-Statex B) | 3 | 52 |
| 20 (FF-Statex B) | 4 | 62 |
| 20 (FF-Statex B) | 6 | 62 |
| 20 (FF-Statex B) | 10 | 62 |
| 50 (SRF Furnex) | 2 | 55 |
| 50 (SRF Furnex) | 3 | 67 |
| 50 (SFR Furnex) | 4 | 75 |
| 50 (SRF Furnex) | 10 | 75 |

Three similar tests were run on samples prepared as just described but without filler, the respective samples containing 2%, 4%, and 10% of the Luperco ATC catalyst. In each instance, the Barco hardness was 60 units.

As previously indicated herein, my present invention not only provides means for effecting the cure of these unsaturated polyester resins containing carbon black fillers, but also provides means for controlling the hardness of the cured resin mixture. The hardness of the resin is generally increased by the presence of the carbon black filler. However, I can further vary the hardness to meet special requirements by varying the proportion of catalyst used, or by varying the proportion of carbon black used, or by using a carbon black filler of greater or less surface area, or by any combination of these factors.

The effectiveness of the present invention with respect to various unsaturated polyester resins prepared from polyesters of the various polyhydric alcohols and various dibasic acids, previously described, and having different acid numbers, and with various types of carbon black and various promoters, will be further illustrated by the following specific examples, all proportions being by weight:

Example VIII

One hundred parts of a polyester, prepared in conventional manner, as hereinafter described, from 1.5 mols maleic anhydride and 1.65 mols ethylene glycol, was dissolved in 42.5 parts of styrene to give a 70% polyester solution having the following properties:

Viscosity at 25° C _____ 1000–2000 centipoise.
Color _____ Slightly yellow.
Acid number _____ 50.
Polyester content _____ 70%.

To a first portion of this polyester resin, there was added 2% of the Luperco ATC catalyst and 0.2% of dimethylaniline promoter, but no carbon black. To a second portion, there was added 2% Luperco ATC, 0.2% dimethylaniline and 20% of an SRF carbon black. The resultant mixtures were then allowed to gel and harden at room temperature with the following results:

| Portion | 1 | 2 |
|---|---|---|
| Time to gel, minutes | 6 | 0.4 |
| Time to hard-cure, minutes | 9 | 2 |

Example IX

One hundred parts of a polyester prepared from the following formulation:

| | Mols. |
|---|---|
| Maleic anhydride | 0.625 |
| Phthalic anhydride | 0.375 |
| Ethylene glycol | 0.525 |
| Diethylene glycol | 0.525 | was dissolved in 42.5 parts of styrene to give a 70% polyester solution having the following properties:

| | |
|---|---|
| Viscosity at 25° C | 1000 centipoise. |
| Color | Slightly yellow. |
| Acid number | 61. |
| Polyester content | 70%. |

To 100 parts of a first portion of this polyester solution, there was added 2 parts of Luperco ATC and 0.2 parts dimethylaniline. A second portion was prepared identical with the first, except that 20 parts of an SRF carbon black was added. These two portions were then permitted to gel and cure at room temperature as in Example VIII with the following results:

| Portion | 1 | 2 |
|---|---|---|
| Time to gel, minutes | 1.7 | 0.5 |
| Time to hard-cure, minutes | 5.5 | 3.5 |

Example X

On hundred parts of a polyester prepared from the following constituents and proportions thereof:

| | Mols |
|---|---|
| Maleic anhydride | 0.5 |
| Phthalic anhydride | 0.5 |
| Diethylene glycol | 1.1 | was dissolved in 42.5 parts of styrene, the resultant solution having the following properties:

| | |
|---|---|
| Viscosity at 25° C | 500 centipoise. |
| Color | Slightly yellow. |
| Acid number | 73. |
| Polyester content | 70%. |

To two separate portions of this solution, there was added 2% Luperco ATC and 0.2% dimethylaniline. To the first portion, no carbon black was added. To the second portion there was added 20 parts of an SRF carbon black. These separate portions were then permitted to gel and cure, as in the preceding examples, with the following results:

| Portion | 1 | 2 |
|---|---|---|
| Time to gel, minutes | 4 | 1 |
| Time to hard-cure, minutes | 7 | 3.5 |

Example XI

Two separate portions of a polyester solution, prepared as in Example X, but having an acid number of 38, 2% of Luperco ATC and 0.2% dimethylaniline were added. No carbon black was added to the first portion. To the second portion, there was added 20% of an SRF carbon black. The respective mixtures were then permitted to gel and cured, as in the preceding example, with the following results:

| Portion | 1 | 2 |
|---|---|---|
| Time to gel, minutes | 4.5 | 0.5 |
| Time to hard-cure, minutes | 9.5 | 3.5 |

It has been found that with certain types of carbon black, notably EPC (Easy Processing Channel) certain of these promoters are more effective than others in reducing the time to hard-cure. For instance, diethylaniline has been found to be more effective than aniline under such conditions. Further, it has been found that the hard-cure time of mixtures containing EPC black may be materially shortened by increasing the proportion of peroxide accelerator used. This is illustrated by the following examples:

Example XII

One hundred parts of a polyester prepared from the following constituents and proportions thereof:

| | Mols |
|---|---|
| Maleic anhydride | 0.7 |
| Phthalic anhydride | 0.15 |
| Adipic acid | 0.15 |
| Ethylene glycol | 0.55 |
| Diethylene glycol | 0.55 | was dissolved in 42.5 parts of styrene to produce a solution having the following properties:

| | |
|---|---|
| Viscosity at 25° C | 500 centipoise. |
| Color | Slightly yellow. |
| Acid number | 35. |
| Polyester content | 70%. |

Three separate portions of the resultant solution were formulated as set forth in the following tabulation with the indicated results:

| Portion | 1 | 2 | 3 |
|---|---|---|---|
| Polyester Solution | 100 | 100 | 100 |
| Luperco ATC | 2 | 2 | 2 |
| Carbon Black | | 20 (SRF) | 20 (EPC) |
| Promoter, Aniline | 0.2 | 0.2 | 0.2 |
| Time to gel, minutes | 119 | 1.5 | 32 |
| Time to soft-cure, minutes | 150 | 2.5 | 48 |
| Time to hard-cure, minutes | >150 | 5 | >150 |

In three additional portions identical with those just noted, except when diethylaniline was used as the promoter, the following results were obtained:

| Portion | 1 | 2 | 3 |
|---|---|---|---|
| Time to gel, minutes | 4.5 | 2.5 | 6 |
| Time to hard-cure, minutes | 8.5 | 5 | 10 |

When the proportion of Luperco ATC was increased to 4% in portions 1 and 3 containing aniline as the promoter, the following results were obtained:

| Portion | 1 | 3 |
|---|---|---|
| Time to gel, minutes | 3.5 | 2.5 |
| Time to hard-cure, minutes | 8 | 5 |

Example XIII

Three separate portions of a polyester solution, prepared as in the preceding Example XII and having an acid number of 61, were mixed as first described in Example XII except that diethylaniline was used as the promoter instead of aniline. In these tests, the EPC carbon black was found materially to accelerate both gelling time and hard-cure time as indicated in the following tabulation:

| Portion | 1 | 2 | 3 |
|---|---|---|---|
| Time to gel, minutes | 4 | 0.5 | 2 |
| Time to hard-cure, minutes | 6 | 2 | 4.5 |

In tests identical with those of the preceding example except that p-dimethylaminobenzaldehyde was used as the promoter, the polyester solution having an acid number of 61, the following results were obtained:

| Portion | 1 | 2 | 3 |
|---|---|---|---|
| Time to gel, minutes | 35 | 2 | 7.5 |
| Time to hard-cure, minutes | 55 | 6 | 15 |

*Example XIV*

A polyester solution was prepared from the following constituents and proportions thereof and was found to have the properties indicated in the following tabulation:

| | |
|---|---|
| Maleic anhydride | 1 mol. |
| Phthalic anhydride | 1 mol. |
| Propylene glycol | 2.2 mols. |
| Viscosity at 25° C | 160 centipoise. |
| Acid number | 45–50. |
| Polyester content | 70° (in styrene). |

To each of three separate portions there was added 2% Luperco ATC and 0.2% resorcinol promoter. To the first portion, no carbon black was added. To the second and third portions, 20% SRF and 20% EPC carbon black, respectively, were added. The cure characteristics of the respective portions were as follows:

| Portion | 1 | 2 | 3 |
|---|---|---|---|
| Time to gel, minutes | >166 | 13 | 56 |
| Time to hard-cure, minutes | >166 | 20 | 65 |

While any of the promoters heretofore mentioned may be used with advantage, I have found that the primary aromatic amines are less effective at high temperatures than are the tertiary aromatic amines. The latter have been found to be highly effective over a wide temperature range. The secondary aromatic amines more nearly resemble the tertiary aromatic amines in their behavior as promoters, likewise being more highly effective over wide temperature ranges.

In typical formulations, such as previously illustrated herein, the presence of N-di-alkyl anilines has usually caused the mixture to reach its peak exotherm in 2 to 4 minutes at room temperature. Under similar conditions, the use of resorcinol, or p-di-methylaminobenzaldehyde did not effect complete cure in 40 minutes, though these compounds are highly effective at higher temperatures, for instance, 80° C. By employing appropriate combinations of two or more of these promoters, the curing time at room temperature, for instance, may be varied within wide ranges to suit particular requirements.

Methods of preparing these polyesters are well-known to the art. For instance, the polyesters of the foregoing Examples VIII to XIII, inclusive, were prepared as described below in a one-liter flask equipped with a central agitator, a thermometer, a separate opening for filling and sampling and means for heating the flask. The polyhydric alcohol constituent was charged to the flask, agitation and heating started and an atmosphere of nitrogen was maintained in the flask. The material in the flask was thus brought to a temperature of about 80° C. and the anhydride or acid constituent was added, which melts almost immediately to give a clear limpid liquid. The temperature was then gradually increased over a period of 3 hours to 180° C. At about 100° C. an exothermic reaction usually occurs and, at this point, external heating is reduced until the reaction is under control. The water of reaction starts to come off at about 140–150° C. Samples are taken at hourly intervals for determination of the acid number.

After the reaction was brought under control, heating was resumed and the temperature gradually raised over a period of about 2 hours to 200° C. and then further increased to 205°–210° C. which temperature was maintained until the desired acid number had been reached, usually about 50 or lower depending upon the nature and proportions of the reactants present. The heating was then discontinued and the flask allowed to cool to about 100° C. and then 0.003% tertiary butyl catechol was added as an oxidation inhibitor. The resultant polyester was then dissolved in the monomer by running the still warm and liquid polyester into the monomer with stirring.

This application is in-part a continuation of my co-pending application Ser. No. 464,887, filed October 26, 1954, and now abandoned.

I claim:

1. In the process for curing thermosetting polyester resins consisting essentially of a solution of an unsaturated polyhydric alcohol-dibasic acid polyester in a vinyl monomer, the polyester being of linear structure with reoccurring double bonds and the cure being effected in the presence of a peroxide catalyst, the steps of dispersing in the resin solution, prior to curing, carbon black, a diaroyl peroxide catalyst and at least one compound of the class consisting of the primary aromatic amines, the aryl-alkyl secondary amines, the aryl-alkyl tertiary amines and resorcinol and molding and curing the mixture.

2. The method of accelerating the cure, in the presence of a peroxide catalyst, of a thermosetting polyester resin consisting essentially of a solution of an unsaturated polyhydric alcohol-dibasic acid polyester in a vinyl monomer, the polyester being of linear structure with reoccurring double bonds, comprising the step of dispersing in the resin solution, prior to curing, a diaroyl peroxide catalyst, carbon black and at least one compound of the class consisting of the primrary aromatic amines, the aryl-alkyl secondary amines, the aryl-alkyl tertiary amines and resorcinol.

3. The method of claim 2 in which the compound of the last specified group is N-diethyl aniline.

4. The process of claim 1 in which the compound of the last specified group is N-diethyl aniline.

5. A resin composition made in accordance with the process set forth in claim 1.

6. A resin composition made in accordance with the process set forth in claim 1 and in which the compound of said group is N-diethyl aniline.

7. The process of claim 1 in which the unsaturated polyester resin is one resulting from dissolving a polyester of maleic anhydride and ethylene glycol in styrene.

8. The process of claim 1 in which the diaroyl peroxide catalyst is benzoyl peroxide.

9. The process of claim 1 in which the diaroyl peroxide catalyst is p-chlorobenzoyl peroxide.

10. The process of claim 1 in which the diaroyl peroxide catalyst is 2-4,dichlorobenzoyl peroxide.

11. The process of claim 9 in which the compound of the last specified group is N-diethyl aniline.

12. The process of claim 9 in which the compound of the last specified group is p-dimethylaminobenzaldehyde.

13. The process of claim 9 in which there is incorporated in the mixture minor proportion of p-dimethylaminobenzaldehyde and N-diethyl aniline.

References Cited in the file of this patent

UNITED STATES PATENTS

| | | |
|---|---|---|
| 2,480,928 | Hurdis | Sept. 6, 1949 |
| 2,532,475 | Anderson | Dec. 5, 1950 |

OTHER REFERENCES

Polyesters and Their Applications, Reinhold Publishing Corp., New York, pp. 94 and 562, publ. 1956.

UNITED STATES PATENT OFFICE
CERTIFICATE OF CORRECTION

Patent No. 3,010,933 November 28, 1961

Francis Lyon

It is hereby certified that error appears in the above numbered patent requiring correction and that the said Letters Patent should read as corrected below.

Column 6, line 1, for "Example VIII", in italics, read -- Example VII --, in italics; line 6, for "0.33" read -- 0.033 --; column 7, line 72, for "95" read -- 9.5 --; column 9, line 19, for "70°" read -- 70% --.

Signed and sealed this 24th day of April 1962.

(SEAL)
Attest:

ESTON G. JOHNSON
Attesting Officer

DAVID L. LADD
Commissioner of Patents